Figure 1:
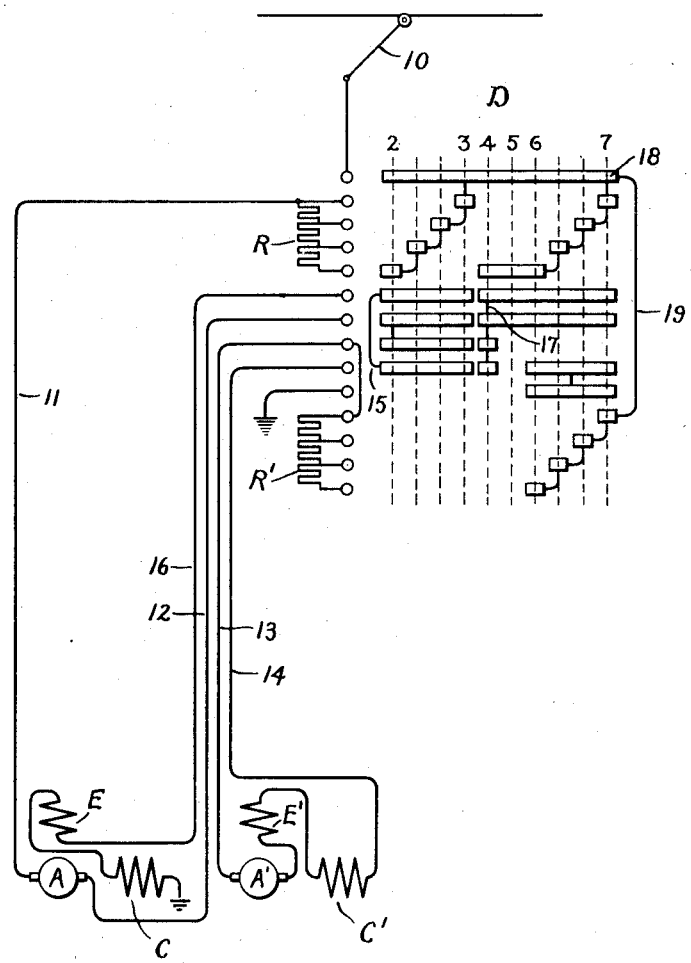

T. VON ZWEIGBERGK.
MOTOR CONTROL SYSTEM.
APPLICATION FILED JAN. 16, 1911.

1,022,917.

Patented Apr. 9, 1912.
2 SHEETS—SHEET 1.

Witnesses:
George H. Tilden
J. Ellis Glen.

Inventor:
Thorsten Von Zweigbergk,
by Albert G. Davis
His Attorney.

T. VON ZWEIGBERGK.
MOTOR CONTROL SYSTEM.
APPLICATION FILED JAN. 16, 1911.
1,022,917.
Patented Apr. 9, 1912.
2 SHEETS—SHEET 2.
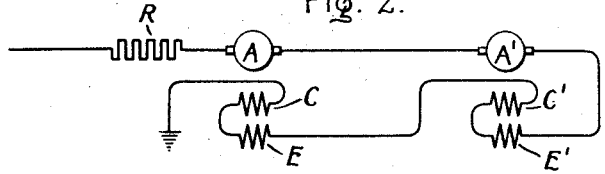
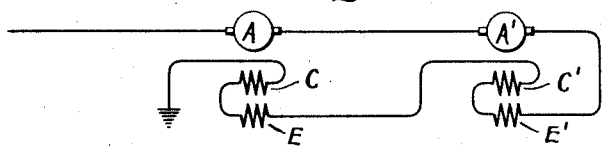
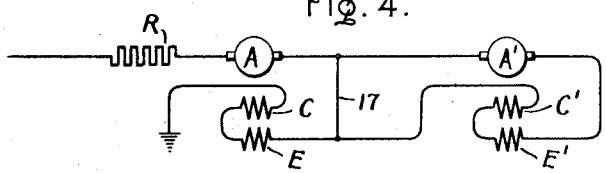
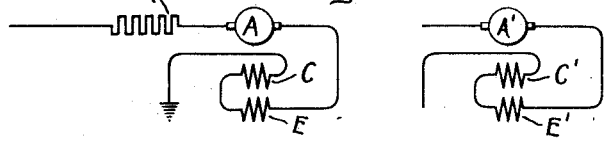
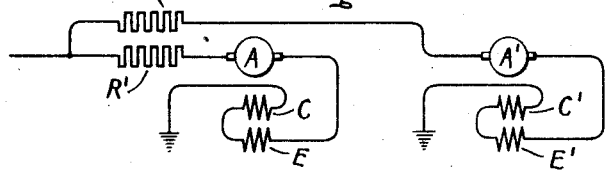
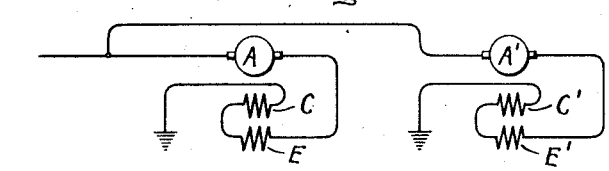
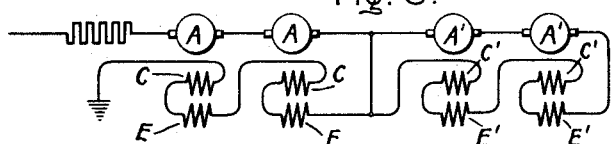
Witnesses:
George H. Tilden
J. Ellis Glen
Inventor:
Thorsten Von Zweigbergk,
by Albert G. Davis
His Attorney.

UNITED STATES PATENT OFFICE.

THORSTEN von ZWEIGBERGK, OF SOUTHPORT, ENGLAND, ASSIGNOR TO GENERAL ELECTRIC COMPANY, A CORPORATION OF NEW YORK.

MOTOR-CONTROL SYSTEM.

1,022,917.  Specification of Letters Patent.  Patented Apr. 9, 1912.

Application filed January 16, 1911. Serial No. 602,847.

*To all whom it may concern:*

Be it known that I, THORSTEN VON ZWEIGBERGK, a citizen of the United States of America, residing at Southport, England, have invented certain new and useful Improvements in Motor-Control Systems, of which the following is a specification.

This invention relates to the control of electric motors and has for its object the provision of a motor control system in which a plurality of motors are started and brought to normal running condition in a reliable and efficient manner.

My invention relates more specifically to the control of motors by what is known as the series-parallel system of control in which a plurality of motors are first connected in series for starting and then connected in parallel for normal running.

One of the objects of my invention is to provide a system of this character in which the fields of all the motors are connected directly to ground and between the ground and the armatures so as to be on the low potential side of the armatures.

In carrying out my invention I connect all of the armatures together in series to the source of current and connect all the fields in series with each other between the armatures and the ground. By this arrangement the field coils are not subjected to high potential and the motors may be easily reversed by simply reversing the fields.

My invention is particularly well adapted for use with motors having an energizing field and a commutating field, although it is obvious that my invention is not limited to this particular type of motor. By this arrangement one or more motors may be short circuited by establishing a relatively low resistance connection from the conductor which connects the armatures to the conductor which connects the corresponding fields.

Other objects and purposes of my invention will appear in the course of the following specification in which I have shown my invention embodied in concrete form for purposes of illustration.

In the accompanying drawing illustrating my invention diagrammatically, Figure 1 is a diagram of the controller with the motors connected thereto; Figs. 2 to 7 are diagrams showing the motor connections in various positions of the controller; and Fig. 8 shows the circuit connections where four motors are employed.

Referring to the drawings A and A′ represent the armatures of a pair of motors. These motors I have shown for purposes of illustration as having commutating fields C and C′ respectively, while the energizing fields are shown at E and E′ respectively.

In Fig. 1 the controller D is shown in the off position. When the controller is moved to the first position corresponding to the dotted line marked 2, the connections will be as shown in Fig. 2. In this position it will be observed that the two armatures A and A′ are connected directly in series with each other to the source of current through the resistance R, while the fields of the motors C—E and C′—E′ are likewise connected in series between the last armature A′ and ground. During the next two steps of the controller the resistance R is eliminated from the circuit and upon the next succeeding step corresponding to the dotted line marked 3 on the drawing the arrangement of circuits will be as shown in Fig. 3. The connections in Fig. 3 are the same as in Fig. 2 with the exception that the resistance R has been cut out. In this position the current passes from the trolley 10 to the conductor 11 through the armature A, conductor 12, through the controller to conductor 13, armature A′ fields E′ and C′ in series, conductor 14, thence through the connection 15 and the controller to conductor 16, fields E and C in series to ground. In the next position of the controller, corresponding to the dotted line marked 4, the circuit connections will be as shown in Fig. 4. In this position the motor armature A′ having the fields C′ and E′ is short circuited by the conductor 17 which connects the conductor between the armatures A and A′ with the conductors between the corresponding fields. The resistance R is likewise connected in series with the armature A.

Referring to Fig. 1, the circuit connections will be as follows: from the trolley 10 to the segment 18, thence through the resistance R, armature A, conductor 12, thence to conductor 16 through the fields E and C in series, to ground. In the next position of the controller corresponding to the dotted line marked 5, the circuit connections will be as shown in Fig. 5, in which the motor armature and fields which have been short circuited in Fig. 4 are entirely disconnected. In the next position of the controller corresponding to the dotted line marked 6, the motor connections are as shown in Fig. 6, the two motors being connected in parallel and a resistance in series with each motor. The connections on the controller are as follows: from trolley 10, segment 18, thence through resistance R, armature A, conductors 12 and 16, through the fields E and C to ground. Connections are likewise made from the segment 18 through the conductor 19, thence through the resistance R', conductor 13, armature A', fields E' and C' to ground. In the next two positions the resistances R and R' are cut out of circuit and in the last position, corresponding to the dotted line marked 7, the circuits will be as shown in Fig. 7, in which the two motors are connected in parallel for normal running.

In Fig. 8 I have shown my invention as applied to four motors instead of two. In this case the armatures AA correspond to the single armature A in the other figures, while the armatures A'A' correspond to the single armature A' in the other figures. The fields are likewise correspondingly arranged. The circuit connections and the mode of operation will be otherwise the same as where only two motors are employed.

While I have described my invention as employing a certain type of motor and as being connected to operate in a specified manner, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is,—

1. In a series parallel system of motor control having a ground return, the combination with a plurality of motors, of means for connecting the armatures of the motors in series to the source of supply and the fields of the motors in series with the armatures, between the armatures and the ground, and means for establishing a short circuit from a connection between the armatures to the connection between their corresponding fields.

2. In a series parallel system of motor control having a ground return, the combination with a pair of motors, of means for connecting the armatures of said motors in series to the source of supply and the fields of the motors with each other and with the armatures between the armatures and the ground, and means for short circuiting one of said motors by establishing a short circuit from the connection between the armatures to the connection between the fields.

3. In a series parallel system of motor control having a ground return, the combination with a plurality of motors having exciting and commutating fields, of means for connecting the armatures of said motors in series to the source of supply and the fields of said motor in series with each other and with the armatures between the armatures and the ground, and means for short circuiting one of said motors by establishing a short circuit from the connection between the armature of said motor and the adjacent armature to a connection between the field of said motor and the adjacent field.

In witness whereof, I have hereunto set my hand this 31st day of December, 1910.

THORSTEN von ZWEIGBERGK.

Witnesses:
 H. WILLIAMS,
 WM. PIERCE.

---

Copies of this patent may be obtained for five cents each, by addressing the "Commissioner of Patents, Washington, D. C."